(12) United States Patent
Sakairi

(10) Patent No.: US 6,408,353 B1
(45) Date of Patent: Jun. 18, 2002

(54) MICROCOMPUTER HAVING SAMPLING FUNCTION OF RETRY REQUESTING SIGNAL IN SYNCRONIZATION WITH STROBE SIGNAL

(75) Inventor: Tetsuya Sakairi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/413,670

(22) Filed: Oct. 6, 1999

(30) Foreign Application Priority Data

Oct. 9, 1998 (JP) .......................................... 10-288213

(51) Int. Cl.[7] .......................... G06F 13/10; G06F 15/78
(52) U.S. Cl. ........................................ 710/305; 710/36
(58) Field of Search ............................ 710/36, 62, 305, 710/100

(56) References Cited

U.S. PATENT DOCUMENTS 5,265,243 A * 11/1993 Povenmire et al. ........... 710/62

FOREIGN PATENT DOCUMENTS

| JP | 61-112272 | 5/1986 |
|----|-----------|--------|
| JP | 62-156751 | 7/1987 |
| JP | 62-172456 | 7/1987 |
| JP | 63-66659  | 3/1988 |
| JP | 4-18657   | 1/1992 |

* cited by examiner

*Primary Examiner*—Glenn A. Auve
(74) *Attorney, Agent, or Firm*—Dickstein, Shapiro, Morin & Oshinsky, LLP.

(57) ABSTRACT

In a microcomputer including a CPU, at least one peripheral unit and a bus control unit connected therebetween, the bus control unit is constructed by a bus control circuit for controlling transfer of data, a strobe signal generating circuit for generating a strobe signal and transmitting the strobe signal to the peripheral unit, a flip-flop for sampling a retry requesting signal from the peripheral unit in synchronization with the strobe signal to generate a strobe requesting signal, and a strobe requesting signal detecting circuit for detecting the strobe requesting signal to reset the flip-flop. The bus control circuit receives the strobe requesting signal to transfer data from the CPU to the peripheral unit. The strobe signal generating circuit receives the strobe requesting signal to generate another strobe signal.

12 Claims, 6 Drawing Sheets

MICROCOMPUTER HAVING SAMPLING FUNCTION OF RETRY REQUESTING SIGNAL IN SYNCRONIZATION WITH STROBE SIGNAL

BACKGROUND OF THE INVENTION

1. Field of the Invention

The present invention relates to a microcomputer, and more particularly, to the improvement of a sampling function of a retry requesting signal from peripheral units.

2. Description of the Related Art

In a prior art microcomputer including a central processing unit (CPU), at least one peripheral unit and a bus control unit connected therebetween, the bus control unit is constructed by a bus control circuit for controlling transfer of data, a strobe signal generating circuit for generating a strobe signal and transmitting the strobe signal to the peripheral unit, and a flip-flop for sampling a retry requesting signal from the peripheral unit in synchronization with a clock signal to generate a strobe requesting signal. The bus control circuit receives the strobe requesting signal to transfer data from the CPU to the peripheral unit. The strobe signal generating circuit receives the strobe requesting signal to generate another strobe signal. This will be explained later in datail.

In the above-described prior art microcomputer, however, if the peripheral unit is not synchronized with the clock signal while the CPU and the bus control unit are synchronized with the clock signal, unnecessary retry operations may be carried out and required retry operations may not be carried out. That is, the retry requesting signal may be sampled by the flip-flop to carry out a retry operation. On the other hand, in an abnormal state where the write operation fails, the sampling of the retry requesting signal by the flip-flop may be delayed which would delay the generation of an waiting signal for the CPU, so that a retry operation is not carried out.

SUMMARY OF THE INVENTION

It is an object of the present invention to be able to sample only required retry requesting signals in a microcomputer.

According to the present invention, in a microcomputer including a CPU, at least one peripheral unit and a bus control unit connected therebetween, the bus control unit is constructed by a bus control circuit for controlling transfer of data, a strobe signal generating circuit for generating a strobe signal and transmitting the strobe signal to the peripheral unit, a flip-flop for sampling a retry requesting signal from the peripheral unit in synchronization with the strobe signal to generate a strobe requesting signal, and a strobe requesting signal detecting circuit for detecting the strobe requesting signal to reset the flip-flop. The bus control circuit receives the strobe requesting signal to transfer data from the CPU to the peripheral unit. The strobe signal generating circuit receives the strobe requesting signal to generate another strobe signal.

If the active time period of the strobe signal is suitably adjusted, a retry requesting signal having a short period time in a normal state can not be sampled, while a retry requesting signal having a long period time in an abnormal state can be sampled.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENTS

Before the description of the preferred embodiments, a prior art microcomputer will be explained with reference to FIG. 1.

Figure 1:
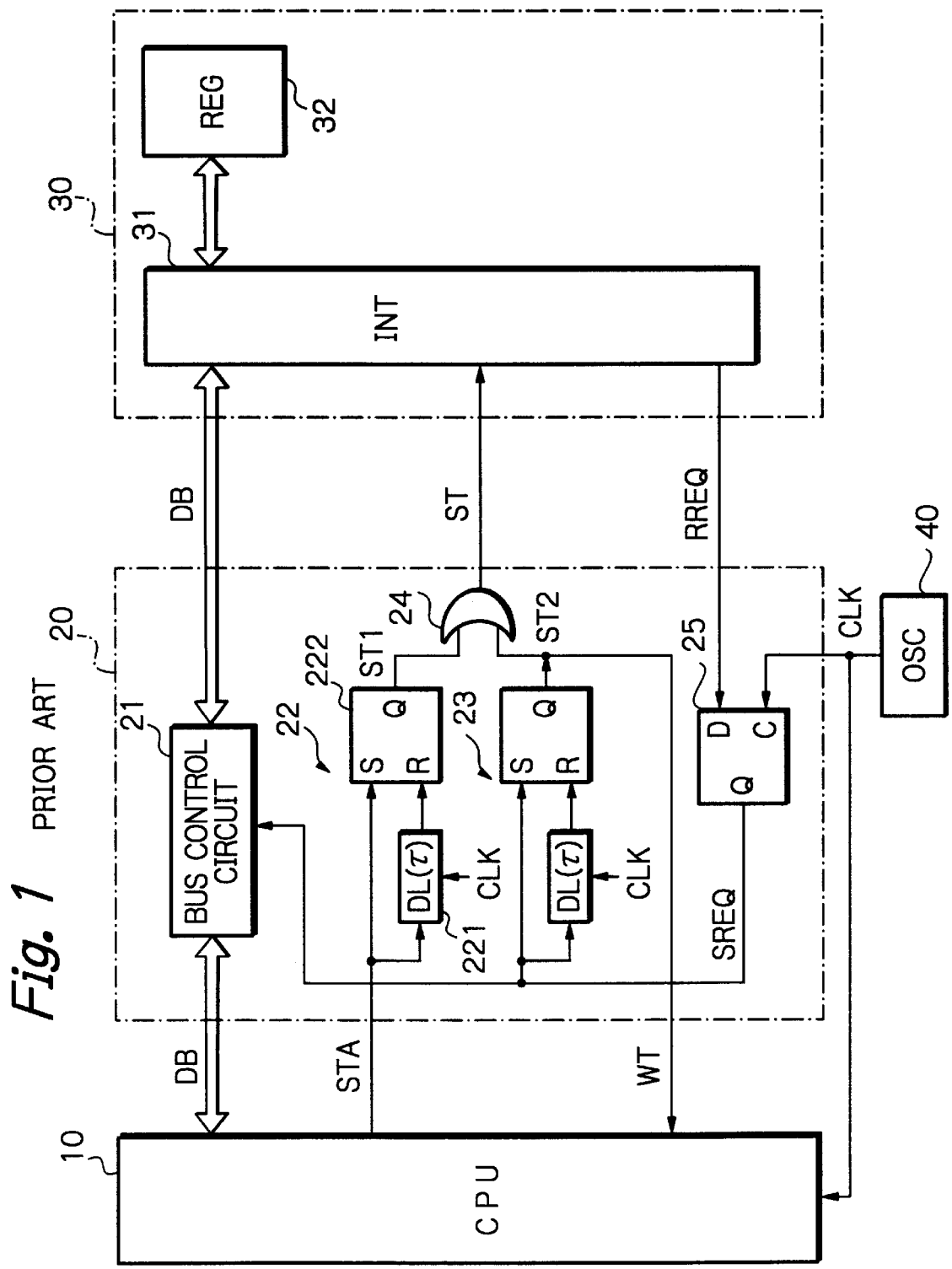
FIG. 1 is a block circuit diagram illustrating a prior art microcomputer.

In FIG. 1, reference numeral 10 designates a CPU, 20 designates a bus control unit, 30 designates a peripheral unit, and 40 designates an oscillator for generating a clock signal CLK. The clock signal CLK is supplied to the CPU 10 and the bus control circuit 20, but is not supplied to the peripheral unit 30. Therefore, the CPU 10 and the bus control unit 20 are synchronized with the clock signal CLK, while the peripheral unit 30 is not synchronized with the clock signal CLK.

The bus control unit 20 is constructed by a bus control circuit 21, a strobe signal generating circuit 22 for generating a strobe signal ST1 in response to a bus cycle start signal STA from the CPU 10, a strobe signal generating circuit 23 for generating a strobe signal ST2 in response to a strobe requesting signal SREQ, an OR circuit 24 for receiving the strobe signals ST1 and ST2 to generate a strobe signal ST, and a T-type flip-flop 25 for generating the strobe requesting signal SREQ.

The peripheral unit 30 is constructed by an interface circuit 31 and a register 32. The interface circuit 31 performs a read/write operation of data upon the register 32.

The bus control circuit 21 receives the strobe requesting signal SREQ to control a bus DB connected between the CPU 10 and the interface circuit 31.

The strobe signal generating circuit 22 is constructed by a delay circuit 221 and an RS-type flip-flop 222. In this case, the delay circuit 221 delays the bus cycle start signal STA from the CPU 90 by a predetermined number of pulses of the clock signal CLK which corresponds to a time τ. Therefore, the RS-type flip-flop 222 is set by a falling edge of the bus cycle start signal STA and is reset by its delayed falling edge, to thereby generate a strobe signal ST1 having a time duration of τ.

Similarly, the strobe signal generating circuit 23 is constructed by a delay circuit 231 and an RS-type flip-flop 232. In this case, the delay circuit 231 delays the strobe requesting signal SREQ by a predetermined number of pulses of the clock signal CLK which also corresponds to a time τ. Therefore, the RS-type flip-flop 232 is set by a falling edge of the strobe requesting signal SREQ and is reset by its delayed falling edge, to thereby generate a strobe signal ST2 having a time duration of τ.

Note that each of the delay circuits 221 and 231 can be constructed by a counter for counting the pulses of the clock signal CLK and a comparator for comparing the content of the counter with a predetermined value. Therefore, if this predetermined value is changed, the time duration τ can be changed.

The T-type flip-flop 25 samples a retry requesting signal RREQ from the interface circuit 31 of the peripheral unit 30 in synchronization with the clock signal CLK to generate the strobe requesting signal SREQ.

The retrying operation of the micro computer of FIG. 1 is explained below.

Upon receipt of a strobe signal ST, the interface circuit 31 fetches data from the bus DB and writes the data into the register 32, and simultaneously, the interface circuit 31 activates a retry requesting signal RREQ. In this case, if such a write operation succeeds normally, the interface circuit 31 immediately deactivates the retry requesting signal RREQ. On the other-hand, if the write operation fails, the interface circuit 31 continues to activate the retry requesting signal RREQ.

In the microcomputer of FIG. 1, the T-type flip-flop 25 is synchronized with the clock signal CLK and the retry requesting signal RREQ is not synchronized with the clock signal CLK. Therefore, even in a normal state, the retry requesting signal RREQ may be sampled by the T-type flip-flop 25 to carry out a retry operation. On the other hand, in an abnormal state where the write operation fails, the sampling of the retry requesting signal RREQ by the T-type flip-flop 25 may he delayed which would delay the generation of a waiting signal WT, so that a retry operation is not carried out.

Figure 2:
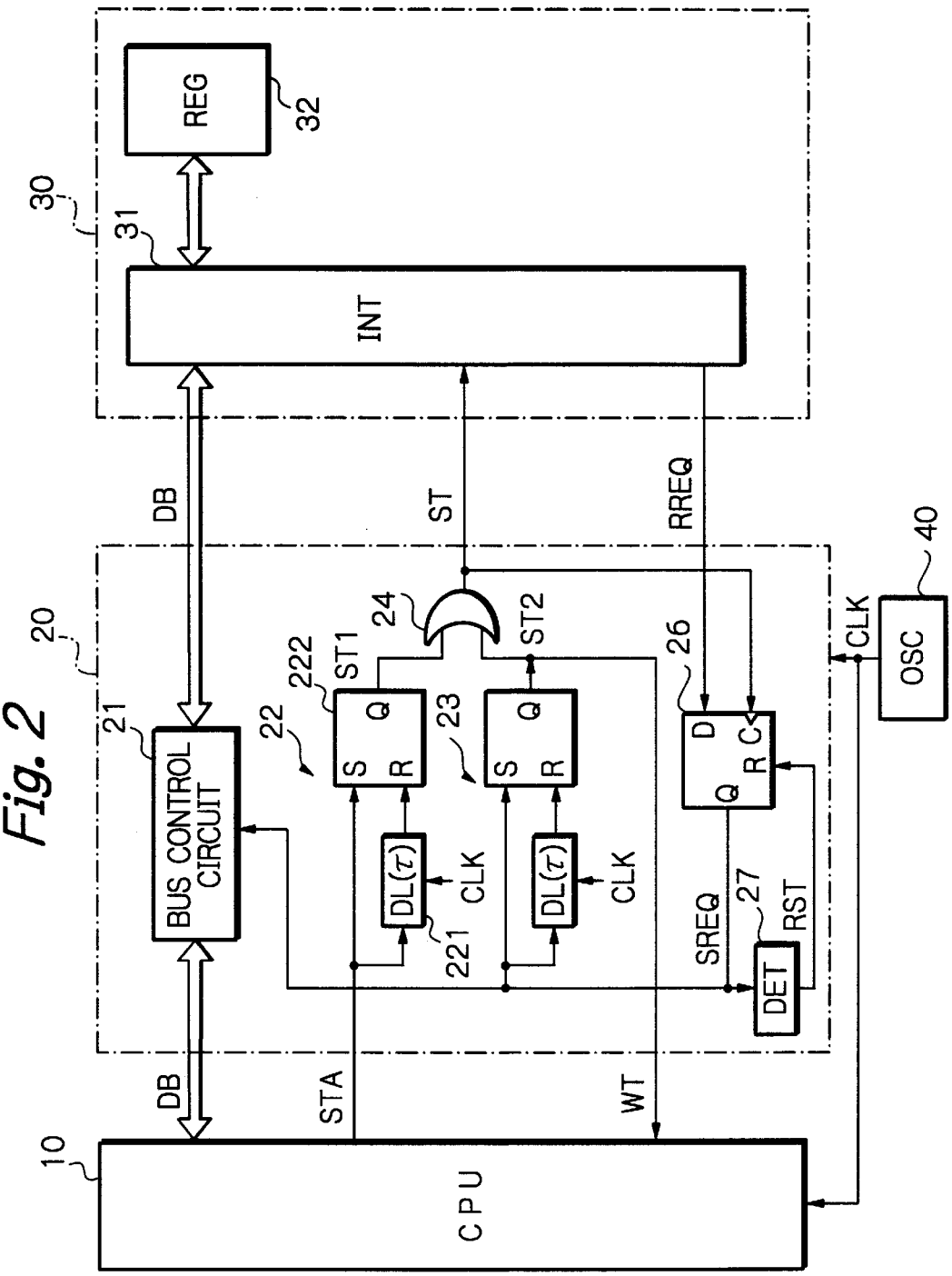
FIG. 2 is a block circuit diagram illustrating a first embodiment of the microcomputer according to the present invention.

In FIG. 2, which illustrates a first embodiment of the present invention, a D-type flip-flop 26 and a strobe requesting signal detecting circuit 27 are provided instead of the T-type flip-flop 25 of FIG. 1.

The D-type flip-flop 26 has a data input terminal D for receiving a retry requesting signal RREQ, a clock input terminal C for receiving a strobe signal ST, an output terminal Q for generating a strobe requesting signal SREQ and a reset terminal R for receiving a reset signal RST from the strobe signal requesting signal detecting circuit 27. Note that the D-type flip-flop 26 samples the retry requesting signal RREQ in synchronization with a falling edge of the strobe signal ST.

Figure 3:
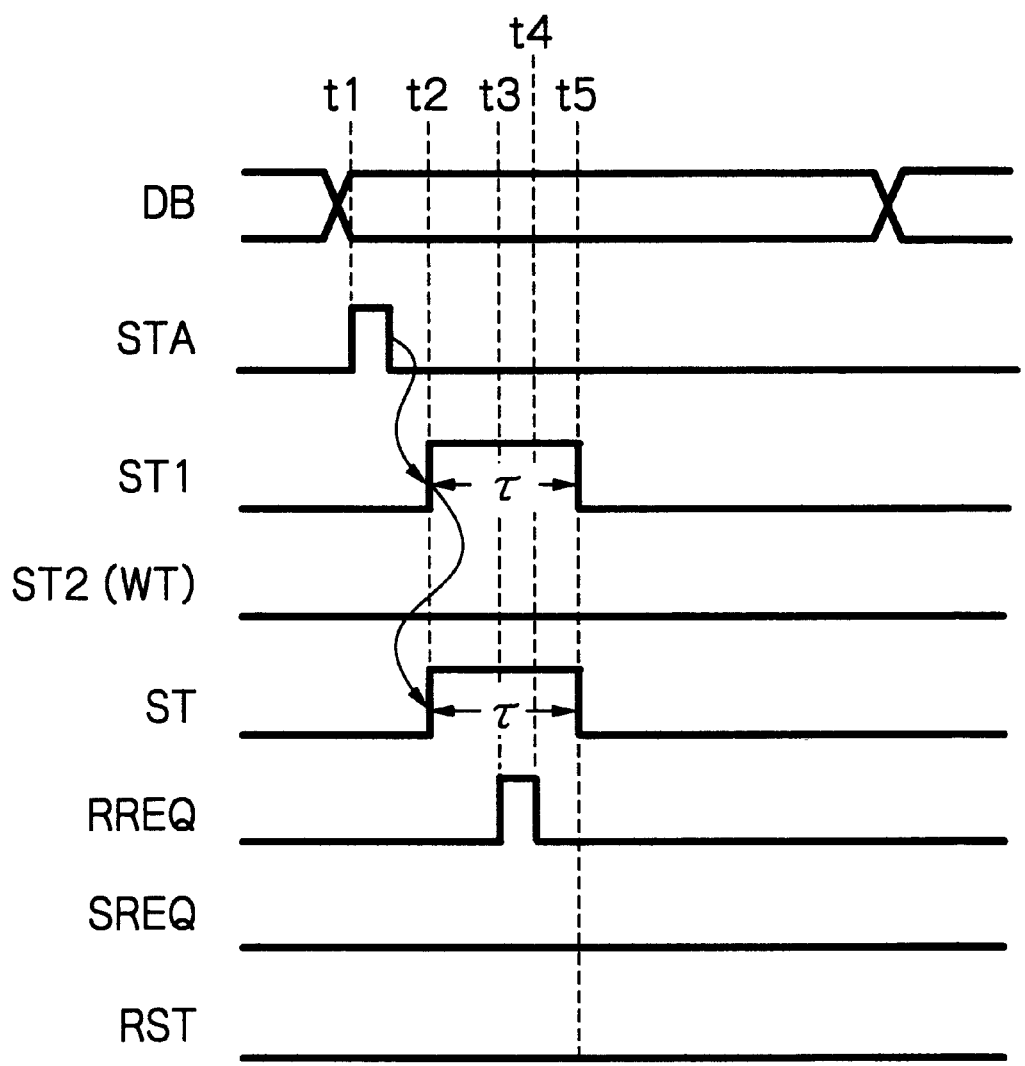
FIGS. 3 and 4 are timing diagrams for explaining the operation of the microcomputer of FIG. 2.

The operation of the microcomputer of FIG. 2 where no retry operation is carried out will be explained next with reference to FIG. 3.

First, at time t1, the CPU 10 generates a bus cycle start signal STA, and also generates data on the bus DB.

Next, at time t2, upon receipt of the bus cycle start signal STA, the strobe signal generating circuit 22 generates a strobe signal ST1 having an active duration τ. As a result, the strobe signal ST1 is transmitted as a strobe signal ST via the OR circuit 24 to the interface circuit 31. Therefore, the interface circuit 31 initiates a data write operation upon the register 32, and later at time t3, the interface circuit 31 generates a retry requesting signal RREQ and transmits it to the D-type flip-flop 26. In a normal state, since the data is quickly written into the register 32, at time tit, the interface circuit 31 stops the generation of the retry requesting signal RREQ.

Next, at time t5, the strobe signal ST1(ST) is deactivated. In this case, however, since the retry requesting signal RREQ is deactivated, the D-type flip-flop 26 does not sample the retry requesting signal RREQ. Therefore, no retry operation is carried out.

Figure 4:
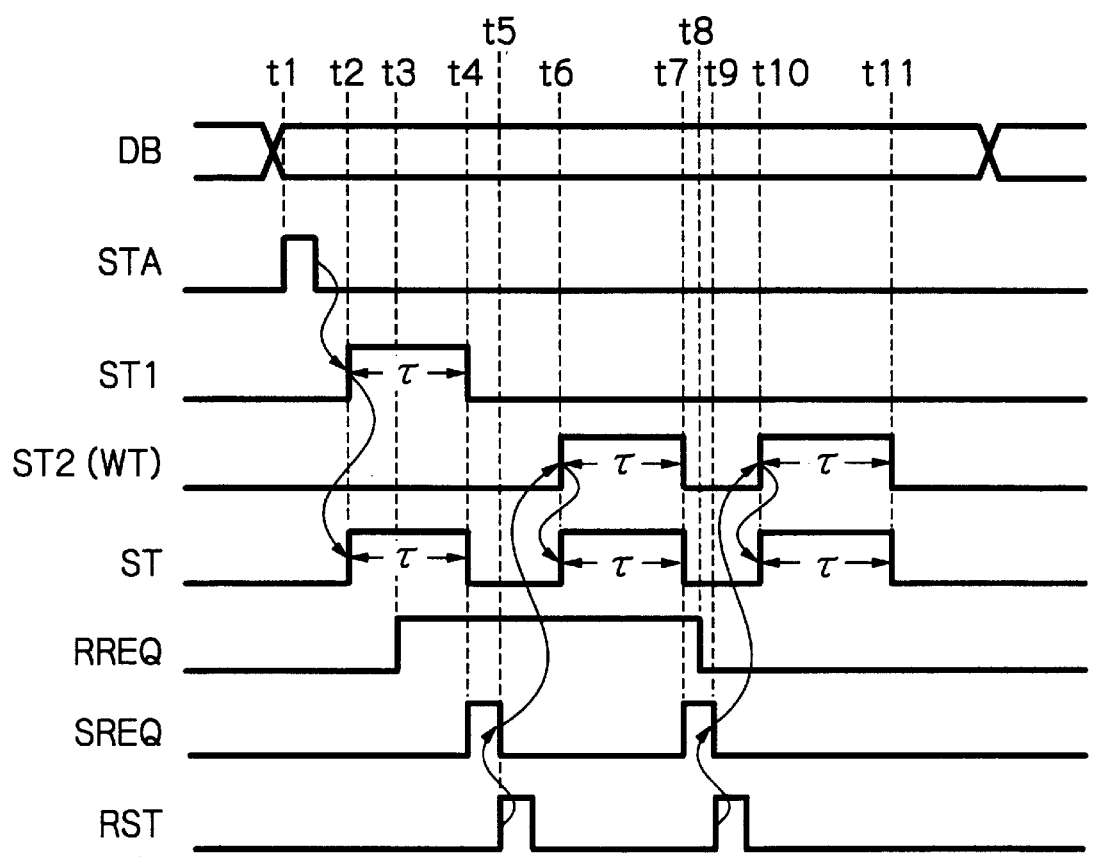

The operation of the microcomputer of FIG. 2 where a retry operation is carried out will be explained next with reference to FIG. 4.

First, at time t1, the CPU 10 generates a bus cycle start signal STA, and also generates data on the bus DB.

Next, at time t2, upon receipt of the bus cycle start signal STA, the strobe signal generating circuit 22 generates a strobe signal ST1 having an active duration τ. As a result, the strobe signal ST1 is transmitted as a strobe signal ST via the OR circuit 24 to the interface circuit 31. Therefore, the interface circuit 31 initiates a data write operation upon the register 32, and later at time t3, the interface circuit 31 generates a retry requesting signal RREQ and transmits it to the D-type flip-flop 26. In an abnormal state, since the data is not written into the register 32, the interface circuit 31 never stops the generation of the retry requesting signal RREQ.

Next, at time t4, the strobe signal ST1(ST) is deactivated. In this case, since the retry requesting signal RREQ is still activated, the D-type flip-flop 26 samples the retry requesting signal RREQ. Therefore, a strobe requesting signal SREQ is generated from the D-type flip-flop 26.

Next, at time t5, the strobe requesting signal detecting circuit 27 detects the strobe requesting signal SREQ to generate a reset signal RST. As a result, the D-type flip-flop 26 is reset, so as to reset the strobe requesting signal SREQ.

Next, at time t6, upon receipt of the strobe request signal SREQ, the strobe signal generating circuit 23 generates a strobe signal ST2 having an active duration τ. As a result, the strobe signal ST2 is transmitted as a strobe signal ST via the OR circuit 24 to the interface circuit 31. Simultaneously, the strobe signal ST2 is transmitted as a waiting signal WT to the CPU 10, so that the CPU 10 continues to generate the data. Also, the bus control circuit 21 receives the strobe requesting signal SREQ. Therefore, the interface circuit 31 retries a data write operation upon the register 32.

Next, at time t7, the strobe signal ST2(ST) is deactivated. In this case, since the retry requesting signal RREQ is still activated, the D-type flip-flop 26 samples the retry requesting signal RREQ. Therefore, a strobe requesting signal SREQ is generated from the D-type flip-flop 26.

Also, assume that the date is written into the register 32, and at time t8, the interface circuit 31 stops the generation of the retry requesting signal RREQ.

Next, at time t9, the strobe requesting signal detecting circuit 27 detects the strobe requesting signal SREQ to generate a reset signal RST. As a result, the D-type flip-flop 26 is reset, so as to reset the strobe requesting signal SREQ.

Next, at time t10, upon receipt of the strobe requesting signal SREQ, the strobe signal generating circuit 23 generates a strobe signal ST2 having an active duration τagain. As a result, the strobe signal ST2 is transmitted as a strobe signal ST via the OR circuit 24 to the interface circuit 31. Simultaneously, the strobe signal ST2 is transmitted as a waiting signal WT to the CPU 10, so that the CPU 10 continues generating the data. Also, the bus control circuit 21 receives the strobe requesting signal SREQ. Therefore, the interface circuit 31 retries a data write operation upon the register 32.

Next, at time t11, the strobe signal ST2(ST) is deactivated. In this case, however, since the retry requesting signal RREQ is already activated, the D-type flip-flop 26 does not sample the retry requesting signal RREQ. Therefore, no strobe requesting signal SREQ is generated from the D-type flip-flop 26.

Thus, the retry operation is completed.

In the microcomputer of FIG. 2, since a retry requesting signal RREQ generated from the peripheral unit 30 is sampled by the strobe signal ST, only required retry operations can be surely carried out.

Figure 5:
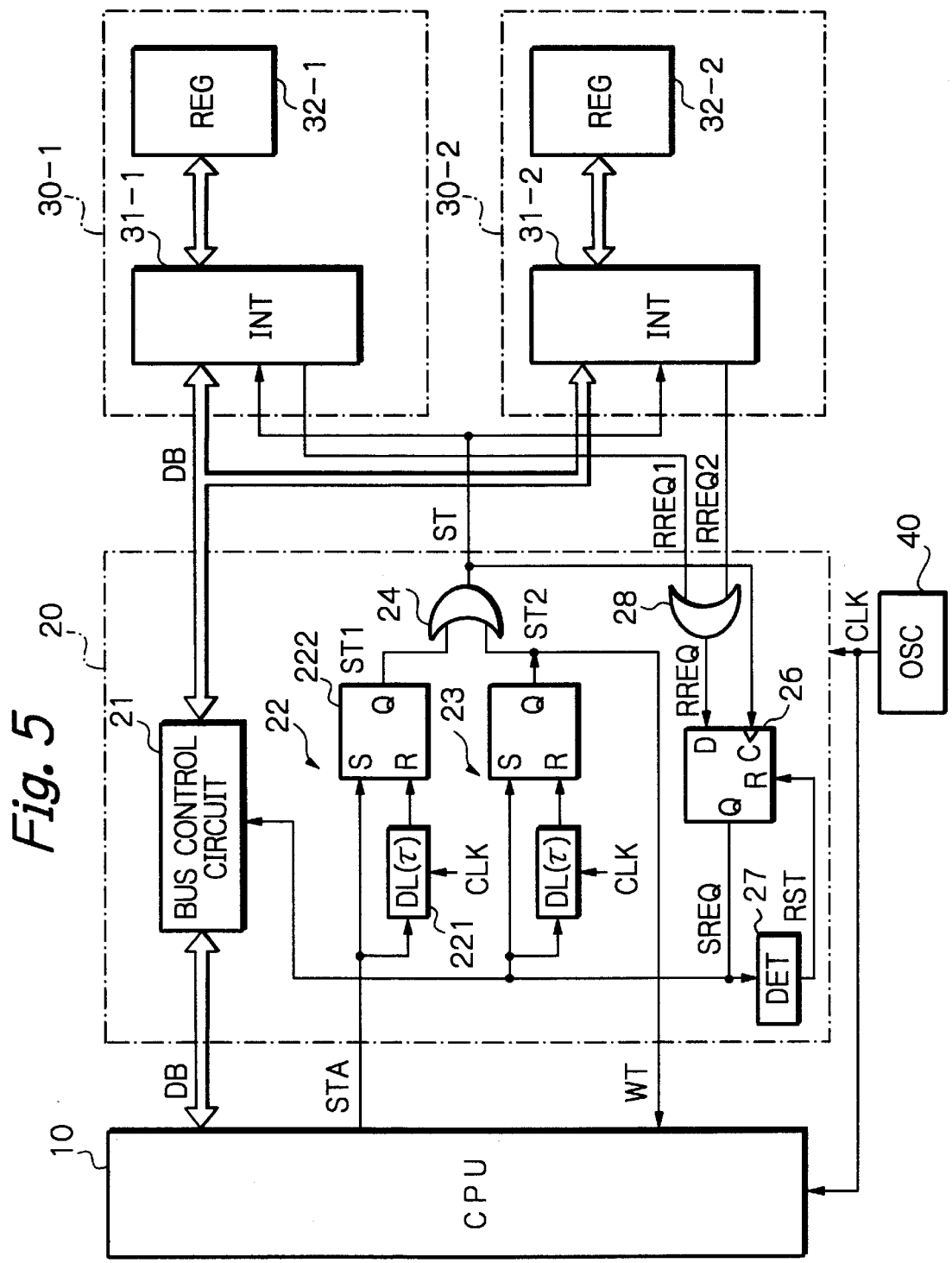
FIG. 5 is a block circuit diagram illustrating a second embodiment of the microcomputer according to the present invention.

In FIG. 5, which illustrates a second embodiment of the present invention, a plurality of peripheral units such as 30-1 and 30-2 which have the same configuration as the peripheral unit 30 of FIG. 2 are provided, and an OR circuit 28 for receiving retry requesting signals RREQ1 and RREQ2 from the peripheral units 30-1 and 30-2 is provided in the bus control unit 20. That is, if one of the peripheral units 30-1 and 30-2 generates a retry requesting signal RREQ1 or RREQ2, the OR circuit 28 generates a retry requesting signal RREQ. Therefore, the bus control unit 20 of FIG. 5 can operate in the same way as in FIG. 2.

Figure 6:
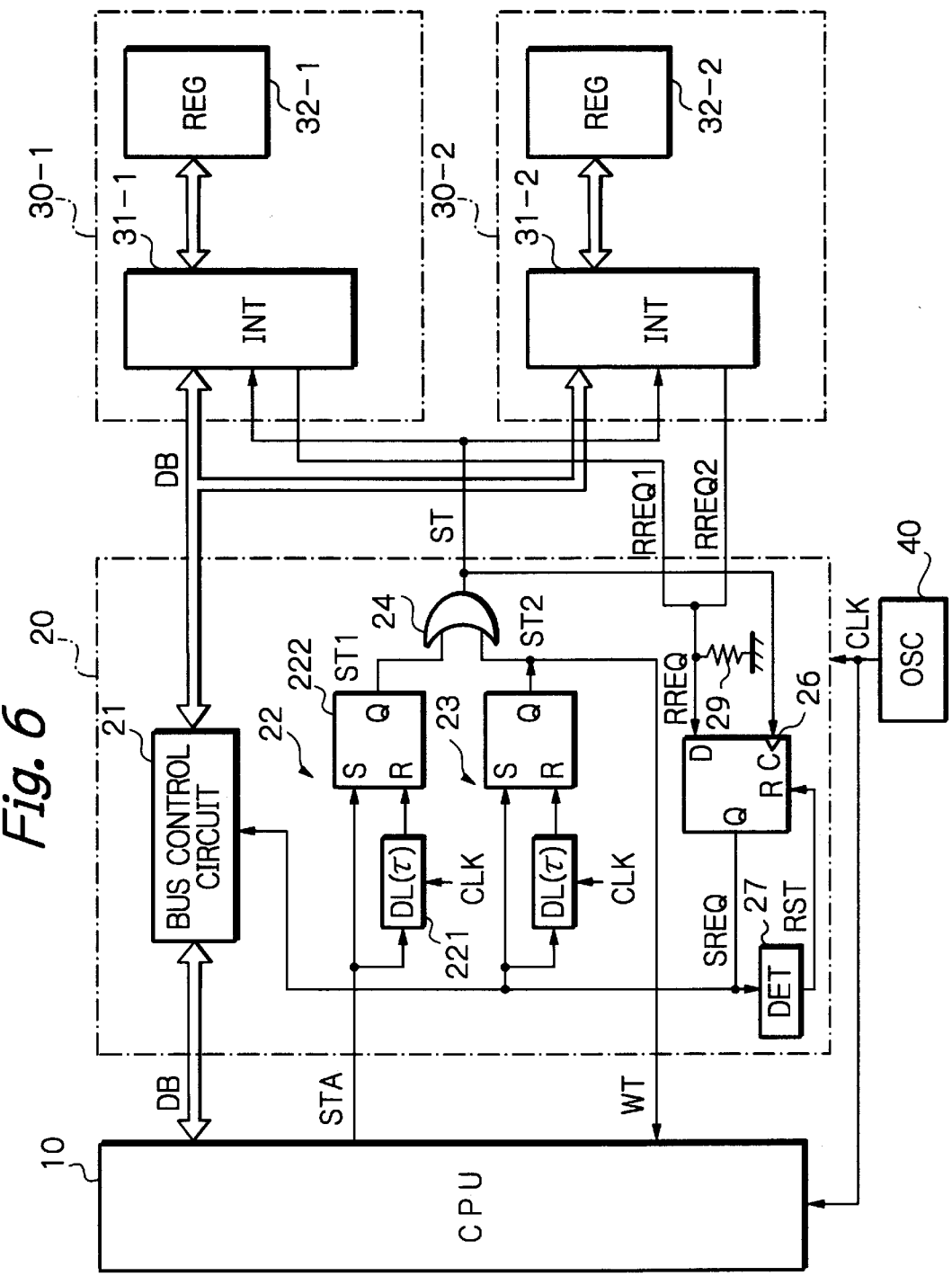
FIG. 6 is a block circuit diagram illustrating a third embodiment of the microcomputer according to the present invention.

In FIG. 6, which illustrates a third embodiment of the present invention, a pull-down resistor 29 is provided instead of the OR circuit 28 of FIG. 5. Even in FIG. 6, if one of the peripheral units 30-1 and 30-2 generates a retry requesting signal RREQ1 or RREQ2, the output of the pull-down resistor 29 becomes a retry requesting signal RREQ. Therefore, the bus control unit 20 of FIG. 6 can operate in the same way as in FIG. 2. Note that the value of the pull-down resistor 29 depends upon the number of peripheral units connected to the bus control unit 20.

As explained herein above, according to the present invention, since a retry requesting signal is sampled by a strobe signal, only required retry operations can be surely carried out.

What is claimed is:

1. A microcomputer including a CPU, a bus control unit connected to said CPU, and at least one peripheral unit connected to said bus control unit, wherein said bus control unit comprises:
   a bus control circuit, connected between said CPU and said peripheral unit, for controlling transfer of data therebetween;
   a strobe signal generating circuit for generating a strobe signal and transmitting said strobe signal to said peripheral unit;
   a flip-flop, connected to said bus control circuit and said strobe signal generating circuit, for sampling a retry requesting signal from said peripheral unit in synchronization with said strobe signal to generate a strobe requesting signal; and
   a strobe requesting signal detecting circuit, connected to said flip-flop, for detecting said strobe requesting signal to reset said flip-flop,
      said bus control circuit receiving said strobe requesting signal to transfer data from said CPU to said peripheral unit,
      said strobe signal generating circuit receiving said strobe requesting signal to generate another strobe signal.

2. The microcomputer as set forth in claim 1, further comprising an oscillator connected to only said CPU and said bus control unit.

3. The microcomputer as set forth in claim 1, wherein said flip-flop samples said retry requesting signal in synchronization with a trailing edge of an active period of said strobe signal.

4. The microcomputer as set forth in claim 1, wherein said strobe signal generating circuit comprises:
   a first strobe signal generating circuit, connected to said CPU, for receiving a bus cycle start signal from said CPU to generate a first strobe signal;
   a second strobe signal generating circuit, connected to said flip-flop, for receiving said strobe requesting signal to generate a second strobe signal; and
   a logic circuit, connected to said first and second strobe signal generating circuits, for receiving one of said first and second strobe signals to generate said strobe signal, said second strobe signal being transmitted as a waiting signal to said CPU.

5. A microcomputer including a CPU, a bus control unit connected to said CPU, and a plurality of peripheral units connected to said bus control unit, wherein said bus control unit comprises:
   a bus control circuit, connected between said CPU and said peripheral units, for controlling transfer of data therebetween;
   a strobe signal generating circuit for generating a strobe signal and transmitting said strobe signal to said peripheral units;
   an OR circuit, connected to said peripheral units, for receiving sub retry requesting signals from said peripheral units to generate a retry requesting signal;
   a flip-flop, connected to said OR circuit, said bus control circuit and said strobe signal generating circuit, for sampling said retry requesting signal in synchronization with said strobe signal to generate a strobe requesting signal; and
   a strobe requesting signal detecting circuit, connected to said flip-flop, for detecting said strobe requesting signal to reset said flip-flop,
      said bus control circuit receiving said strobe requesting signal to transfer data from said CPU to said peripheral unit,
      said strobe signal generating circuit receiving said strobe requesting signal to generate another strobe signal.

6. The microcomputer as set forth in claim 5, further comprising an oscillator connected to only said CPU and said bus control unit.

7. The microcomputer as set forth in claim 5, wherein said flip-flop samples said retry requesting signal in synchronization with a trailing edge of an active period of said strobe signal.

8. The microcomputer as set forth in claim 5, wherein said strobe signal generating circuit comprises:
   a first strobe signal generating circuit, connected to said CPU, for receiving a bus cycle start signal from said CPU to generate a first strobe signal;
   a second strobe signal generating circuit, connected to said flip-flop, for receiving said strobe requesting signal to generate a second strobe signal; and
   a logic circuit, connected to said first and second strobe signal generating circuits, for receiving one of said first and second strobe signals to generate said strobe signal, said second strobe signal being transmitted as a waiting signal to said CPU.

9. A microcomputer including a CPU, a bus control unit connected to said CPU, and a plurality of peripheral units connected to said bus control unit, wherein said bus control unit comprises:
   a bus control circuit, connected between said CPU and said peripheral units, for controlling transfer of data therebetween;
   a strobe signal generating circuit for generating a strobe signal and transmitting said strobe signal to said peripheral units;
   a pull-down resistor, connected to said peripheral units, for receiving sub retry requesting signals from said peripheral units to generate a retry requesting signal;
   a flip-flop, connected to said pull-down resistor, said bus control circuit and said strobe signal generating circuit, for sampling said retry requesting signal in synchronization with said strobe signal. to generate a strobe requesting signal; and a strobe requesting signal detecting circuit, connected to said flip-flop, for detecting said strobe requesting signal to reset said flip-flop, said bus control circuit receiving said-strobe requesting signal to transfer data from said CPU to said peripheral unit, said strobe signal generating circuit receiving said strobe requesting signal to generate another strobe signal.

10. The microcomputer as set forth in claim 9, further comprising an oscillator connected to only said CPU and said bus control unit.

11. The microcomputer as set forth in claim 9, wherein said flip-flop samples said retry requesting signal in synchronization with a trailing edge of an active period of said strobe signal.

12. The microcomputer as set forth in claim 9, wherein said strobe signal generating circuit comprises:

a first strobe signal generating circuit, connected to said CPU, for receiving a bus cycle start signal from said CPU to generate a first strobe signal;

a second strobe signal generating circuit, connected to said flip-flop, for receiving said strobe requesting signal to generate a second strobe signal; and a logic circuit, connected to said first and second strobe signal generating circuits, for receiving one of said first and second strobe signals to generate said strobe signal, said second strobe signal being transmitted as a waiting signal to said CPU.

* * * * *